United States Patent
Lee

(10) Patent No.: US 8,912,760 B2
(45) Date of Patent: Dec. 16, 2014

(54) METHOD OF ACTIVATING A BATTERY

(75) Inventor: Kun-Ta Lee, Taipei (TW)

(73) Assignee: EliteGroup Computer System Co., Ltd., Taipei (TW)

( * ) Notice: Subject to any disclaimer, the term of this patent is extended or adjusted under 35 U.S.C. 154(b) by 672 days.

(21) Appl. No.: 13/275,228

(22) Filed: Oct. 17, 2011

(65) Prior Publication Data

US 2012/0187910 A1    Jul. 26, 2012

(30) Foreign Application Priority Data

Jan. 26, 2011 (TW) ............................. 100102768 A

(51) Int. Cl.
    *H02J 7/00*        (2006.01)
    *H01M 10/48*      (2006.01)
    *H01M 10/44*      (2006.01)
    *H01M 10/42*      (2006.01)

(52) U.S. Cl.
    CPC ............ *H01M 10/425* (2013.01); *H01M 10/48* (2013.01); *H01M 10/44* (2013.01); *H01M 2010/4271* (2013.01); *H01M 2220/30* (2013.01)
    USPC ......................................................... 320/134

(58) Field of Classification Search
    USPC ......................................................... 320/134
    See application file for complete search history.

(56) References Cited

U.S. PATENT DOCUMENTS

| | | | | |
|---|---|---|---|---|
| 7,176,806 | B2 * | 2/2007 | Bruce et al. | 340/636.1 |
| 7,259,539 | B2 * | 8/2007 | Suzuki et al. | 320/110 |
| 7,482,941 | B2 * | 1/2009 | Bruce et al. | 340/636.1 |
| 7,625,662 | B2 * | 12/2009 | Vaisnys et al. | 429/90 |
| 7,855,010 | B2 * | 12/2010 | Vaisnys et al. | 429/149 |
| 7,868,777 | B2 * | 1/2011 | Bruce et al. | 340/636.1 |
| 8,343,644 | B2 * | 1/2013 | Vaisnys et al. | 429/90 |
| 8,412,658 | B2 * | 4/2013 | Song et al. | 706/25 |
| 8,548,923 | B2 * | 10/2013 | Reed et al. | 705/65 |

* cited by examiner

*Primary Examiner* — Edward Tso
*Assistant Examiner* — Ramy Ramadan

(57) ABSTRACT

A method of activating a battery is applied to an electronic device having a controller that keeps counting system time to acquire a system date. The method includes: (1) acquiring data of the battery, including states, an activation number and a last activation date; (2) performing an activation process and setting the battery in an activation state when determining, based on the data, that the battery is in an inactivation state, the activation number is smaller than a predetermined activation number, and an interval between the last activation date and the system date is greater than a predetermined activation interval; (3) discharging the battery, and charging the battery when determining that a battery power level is less than a predetermined power level; and (4) setting the battery in the inactivation state after the activation process is finished. Therefore, a curing problem of the battery is overcome.

13 Claims, 3 Drawing Sheets

METHOD OF ACTIVATING A BATTERY

BACKGROUND OF THE INVENTION

1. Field of the Invention

This invention relates to methods of activating a battery, and, more particularly, to a method of activating a battery to prevent chemical substances in the battery from being cured.

2. Description of Related Art

In the past, a notebook computer, though meeting the low-profiled and compact sized requirements with regard to the characteristic of easy portability, has an operation capability, hard disk storage capacity, and storage battery that do not satisfy the users. A notebook computer, since having various powerful functionalities, replaces a desktop computer gradually.

Generally, users use a notebook computer in a way like the way that they use a desktop computer. Therefore, the notebook computer is always connected to a power source via an adaptor. As a result, the storage battery of the notebook computer is always in a charging state. The storage battery is a chargeable battery, and is charged and discharged through a chemical reaction. If the storage battery is in the charging state for a long time, the chemical substances in the storage battery will become inactive gradually and likely to be cured finally. As a result, the storage battery has a reduced charging efficiency, or even loses its charging capability.

To address the curing problem, a conventional storage battery is designed to be discharged automatically, and the power level of the battery is gradually reduced. However, when the battery power level is reduced to zero, the chemical substances will soon be cured, and the storage battery cannot be activated for storing power any longer, unless the storage battery is charged immediately. On the other hand, if the storage battery is charged as insufficiently discharging the stored power, the charging process may exhibit poor effects on alleviating the curing problem. The curing problem may be overcome by frequent plugging/unplugging the adaptor, which, however, wears the contact point and results in a loose contact of the adaptor with the power source.

Besides, it is advisable that the storage battery should be charged/discharged every three or four months. However, it is inconvenient for a user to perform the charging/discharging process so frequently.

SUMMARY OF THE INVENTION

In view of the above-mentioned problems of the prior art, the present invention provides a method of activating a battery, which performs an activation process to charge/discharge the battery based on states, an activation number, an activation interval or power level of the battery.

The method of activating a battery is applied to an electronic device having a controller that charges and discharges the battery and keeps counting system time to acquire a system date, and comprises the following steps of: (1) acquiring data of the battery, including states, an activation number and a last activation date of the battery; (2) enabling the controller to perform an activation process on the battery and set the battery in an activation state when determining, based on the data of the battery, that the battery is operating in an inactivation state, the activation number of the battery is smaller than a predetermined activation number, and an interval between the last activation date of the battery and the system date is greater than a predetermined activation interval; (3) enabling the controller to discharge the battery, and enabling the controller to charge the battery when determining that a battery power level of the battery is less than a predetermined power level; and (4) enabling the controller to set the battery in the inactivation state after the activation process is finished.

In an embodiment, step (2) further comprises: (2-1) when the controller begins to perform the activation process, updating the last activation date of the battery with the system date acquired by counting the system time, and storing the updated system date in the battery to be the last activation date of the battery.

In another embodiment, step (2) further comprises: (2-2) clearing the activation number of the battery and updating the system date corresponding to the activation number to be the last activation date, when determining, based on the acquired data of the battery, that the battery is operating in the inactivation state and that the activation number of the battery is not less than the predetermined activation number; and (2-3) acquiring and recording the system date corresponding to the system time counted by the electronic device, and acquiring the data of the battery again and performing a determination process recited in step (2) when determining, after predetermined time based on the recorded system date, that a difference between the predetermined time and the recorded system date is greater than a predetermined read time interval.

In yet another embodiment, step (2) further comprises: (2-4) acquiring and recording the system date corresponding to the system time counted by the electronic device when determining, based on the acquired data of the battery, that the battery is operating in an inactivation state, the activation number of the battery is smaller than a predetermined activation number and an interval between the last activation date of the battery and the system date is not greater than the predetermined activation interval, and acquiring the data of the battery again and performing a determination process recited in step (2) when determining, after predetermined time based on the recorded system date, that a difference between the predetermined time and the recorded system date is greater than a predetermined read time interval.

Compared with the prior art, the method of activating a battery according to the present invention solves the problem that chemical substances in the battery may be cured when the battery is operating in a charging state for a long time, to achieve the efficacy of activating the battery.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
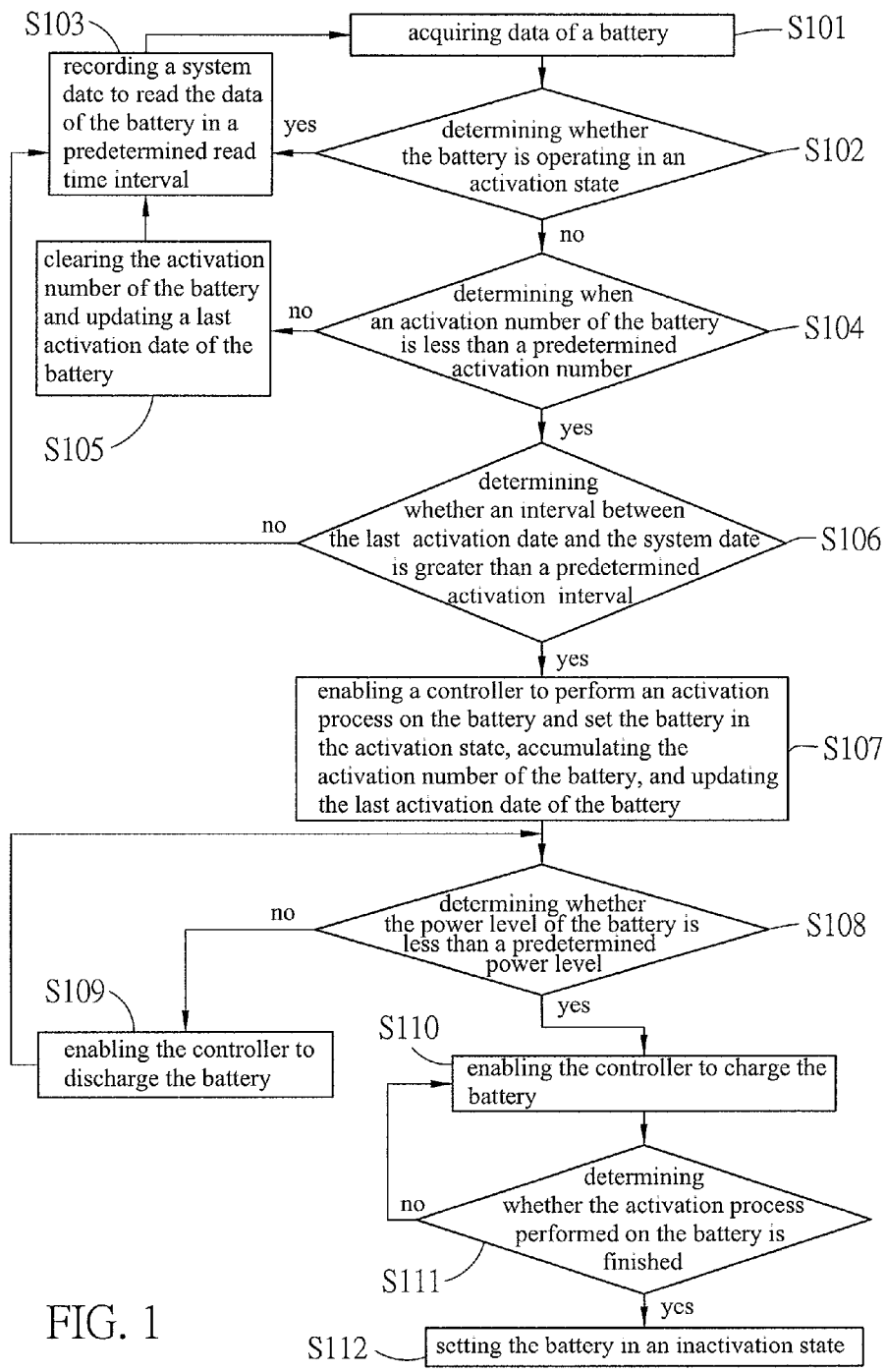
FIG. 1 is a flow chart of a method of activating a battery according to an embodiment of the present invention.

Please refer to FIG. 1, which is a flow chart of a method of activating a battery according to the present invention. The method is applied to an electronic device having a controller that may charge or discharge the battery. The electronic device keeps counting system time to acquire a system date. In FIG. 1, steps S101-S107 are performed when the electronic device is turned on, and steps S108-S112 are performed when the electronic device is turned on or turned off.

In step S101, data of the battery are acquired. After the battery is installed in the electronic device (e.g., a notebook computer), the controller of the electronic device may acquire the data of the battery, including a full power level, a current power level, power capacity, states, an activation number and a last activation data of the battery. In an embodiment, the controller is an embedded controller (EC). After the notebook computer is turned on, an operating system is executed, enabling an application program therein to acquire the states, the activation number and the last activation date of the battery. In an embodiment, the battery may has a storage unit such as an EEPROM. Proceed to step S102.

In step S102, the application program determines whether the battery is operating in an activation state. If the battery is operating in the activation state, the method proceeds to step S103. If the battery is operating in the inactivation state, the method proceeds to step S104.

In step S103, the application program records the system time currently counted by the electronic device to acquire the system date. When the electronic device is turned on and the operating system is executing, the application program determines, after predetermined time based on the recorded system date, whether a difference between the predetermined time and the recorded system date is greater than a predetermined read time interval, and acquires the data of the battery, i.e., returning to step S101, after the difference is greater than the predetermined read time interval, to acquire the data of the battery in intervals and determine whether or not to perform an activation process on the battery subsequently. In order to acquire the data of the battery without affecting the system resources, the application program reads the data of the battery during the predetermined read time interval only. In an embodiment, the predetermined read time interval may be a half or one hour, depending on the reading cycle of the data of the battery. The system date recorded by the application program may be stored in any memory sector of the electronic device.

In step S104, whether the activation number of the battery is less than a predetermined activation number is determined. In an embodiment, the application program is enabled to determine the activation number of the battery, and the predetermined activation number may be five or any other number. If the activation number of the battery is greater than or equal to the predetermined activation number, step S105 is executed. If the activation number of the battery is less than the predetermined activation number, step S106 is executed. A portable device may have an activation number greater than that of a stationary device, since the portable device is used by a salesman, who uses the portable device more frequent than another person who uses the stationary device. On the contrary, if the portable device is used as a stationary device and is connected to a power source via an adaptor for a long time, the battery may have a smaller activation number.

In step S105, the activation number of the battery is cleared, the activation date is updated, i.e., set to be zero, and the last activation date is also updated. The application program stores the updated last activation date and the cleared activation number into the battery. The last activation date is updated with the system date corresponding to the cleared activation. Proceed to step S103, in which the application program is enabled to record the system date acquired by the electronic device when counting the system time, the data of the battery are acquired again when the electrical device arrives the predetermined read time interval, and determination step S102, S104 or S106 is executed.

In step S106, whether an interval between the last activation date of the battery and the system date acquired by the electronic device when counting the system time is greater than a predetermined activation interval is determined. In practice, the application program is enabled to compare the last activation date of the battery and the system date. In an embodiment, the predetermined activation interval may be three months, or longer or shorter. If the interval between the last activation date and the system date is less than or equal to the predetermined activation interval, step S103 is executed, i.e., recording the system data, enabling the application program to determine, after the predetermined time based on the recorded system date, whether the difference between the predetermined time and the recorded system date is greater than the predetermined read time interval, and returning to step S101, i.e., acquiring the data of the battery when the difference is greater than the predetermined read time interval. If the interval between the last activation date and the system date is greater than the predetermined activation interval, step S107 is executed.

It is known from the above that the application program reads the data of the battery (including the states, the activation number and the last activation date of the battery) when the electronic device is turned on and the operating system is executing or during the predetermined read time interval after the electronic device is turned on, so step S103 will be executed under a certain result after the execution of steps S102, S104 and S106. Thus, the application program, after determining that the electronic device arrives the predetermined read time interval based on the recorded system date, reads the data of the battery again and executes the determination step S102, S104 or S106. For instance, if the time interval between the system date (i.e., the current date) corresponding to the counting performed by the electronic device and the recorded system date (i.e., the system date in the determination step S102, S104 or S106) is greater than one hour (i.e., the predetermined read time interval), step S102, S104 or S106 can be executed again.

In step S107, the controller is enabled to perform the activation process on the battery, and set the battery in the activation state; the activation number of the battery is accumulated and the last activation date is updated; and a setting result of the activation state, the activation number and the updated last activation date are stored in the battery. The so-called "activation" means charging/discharging the battery. The application program in the operating system enables the controller in the electronic device to perform the activation process to discharge/charge the battery. When the controller begins the activation process, the application program updates the last activation date of the battery with the system date acquired by the electronic device when counting the system time, and enables the controller to set the battery in the activation state. Before the controller performs the activation process, the application program may display a query window as to whether to perform the activation process. In this step, the controller discharges the battery by cutting off an AC power source. Accordingly, the battery provides the power needed by the electronic device to execute the operating system. When the controller begins to perform the activation process on the battery, the application program stores the updated last activation date and the accumulated activation number into the battery. Then, the method proceeds to step S108.

In step S108, whether the power level of the battery is less than a predetermined power level (e.g., 10% of the power level) is determined. In other words, the controller monitors the power level of the battery when the battery is discharged, and step S109 is executed when the power level of the battery is still greater than the predetermined power level. On the contrary, when the battery is discharged and the power level of the battery is equal to or less than the predetermined power level, step S110 is executed.

In step S109, the controller discharges the battery, and step S108 is executed to determined the power level of the battery.

In step S110, the controller charges the battery, and step S111 is executed.

In S111, the controller is enabled to determine whether the activation process performed on the battery is finished, i.e., determining whether the charging/discharging process is finished. If the activation process is not finished, step S110 is executed to keep charging the battery, or step S112 is executed.

In step S112, the controller sets the battery in the inactivation state, and a setting result of the inactivation state is stored into the battery.

It is known from the above description, together with FIG. 1, that the present invention uses the controller of the electronic device and the application program in the operating system to perform the method of activating a battery, wherein the controller acquires all the data of the battery before the electronic device executes the operating system, and the application program, after the operating system is executed, may also acquire the states, the activation number and the last activation date of the battery, to determine whether the activation process should be performed to discharge/charge the battery. Therefore, the method of activating a battery according to the present invention enables an electronic device to activate a battery based on the states, the activation number, an activation interval or power level, to prevent chemical substances in the battery from being cured.

Figure 2:
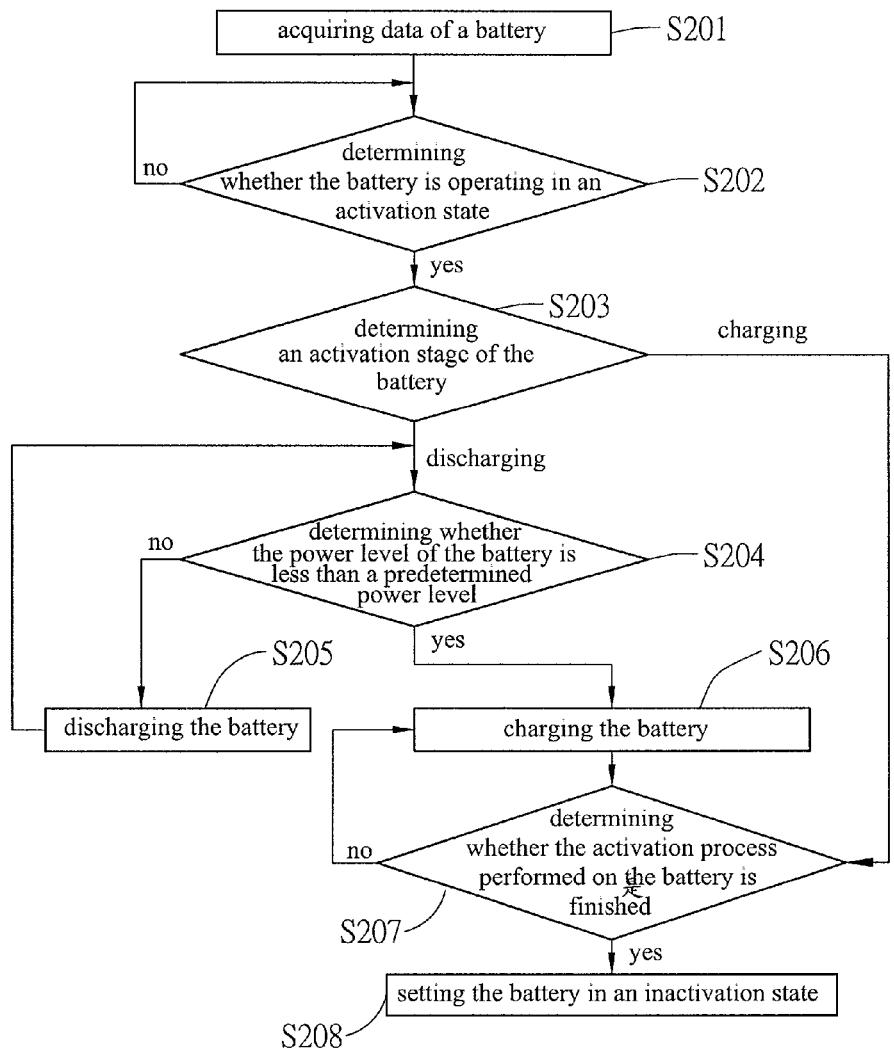
FIG. 2 is a flow chart of a method of activating a battery according to an embodiment of the present invention, when an electronic device, in which the battery is installed, is in a power-off state.

When performing the activation process on the battery, the controller sets the battery in the activation state, and stores the last activation date and the activation number into the battery. Therefore, the battery will not be plugged off the electronic device until the activation process is finished, and the electronic device can read the data of the battery after the battery is installed in the electronic device (or other electronic device), to perform the unfinished activation process after the activation data of the battery are acquired. As shown in FIG. 2, which shows that the activation process is interrupted if the battery is plugged off the electronic device when the activation process is performed. As a result, the activation process is interrupted, and the activation process may be performed after the battery is installed in the electronic device (or other electronic device). Note that the activation process shown in FIG. 2 may be performed when the electronic device is turned on or turned off (i.e., steps S107-S112 shown in FIG. 1). As an example, the electronic device is turned on.

In step S201, data of the battery are acquired. In practice, the battery is installed in the electronic device, and the controller acquires the data of the battery, including a full power level, a current power level, a battery power level, states, an activation number and a last activation date of the battery. Step S202 is executed subsequently, in which whether the battery is operating in the activation state is determined based on the data of the battery. If the battery is operating in the activation state, step S203 is executed.

In step S203, the activation stage of the battery is determined. If the activation stage indicates discharging the battery, step S204 is executed. If the activation stage indicates charging the battery, step S207 is executed.

In step S204, whether the power of the battery is less than the predetermined power level (e.g., about 10% of the full power level) is determined. If the power level of the battery is still greater than the predetermined power level, step S205 is executed, i.e., keeping discharging the battery. If the power level of the battery is less than the predetermine power level, step S206 is executed.

In step S206, the battery keeps being charged. In step S207, whether the activation process that discharges/charges the battery is finished is determined. If the activation process is not finished, step S206 is executed. If the activation process is finished, step S208 is executed, in which the battery is set in the inactivation state.

It is known from the method of activating a battery shown in FIG. 2 that, in addition to the operating system, the activation process may also be performed on the battery when the electronic device is turned off, and the computer is set in the inactivation state after the completion of the activation process. Even if the battery is plugged off the electronic device when the activation process is not finished, the interrupted activation process may still be performed continuously after the battery is installed in the electronic device (or other electronic device), because the battery already had the states, the activation number and the last activation date stored.

It is known from the above that the data of the battery acquired in steps S105, S107 and S112 (or step S208) include the states, the activation number and the last activation date of the battery, the data can be stored in the battery, and steps S102, S104 and S106 can provide a determination process and a good enough battery activation mechanism if the battery is plugged off the electronic device when the activation process is not finished, if the battery is changed to be installed in another electronic device when the activation process is not yet performed, or the electronic device is turned off.

When the electronic device is turned off, the electronic device can still complete the processing steps of the method of activating the battery shown in FIG. 2 with plugging in the power supplied by an electric power company. However, the electronic device can only perform the discharging process of steps S201-S205, provided not plugging in the socket.

Figure 3:
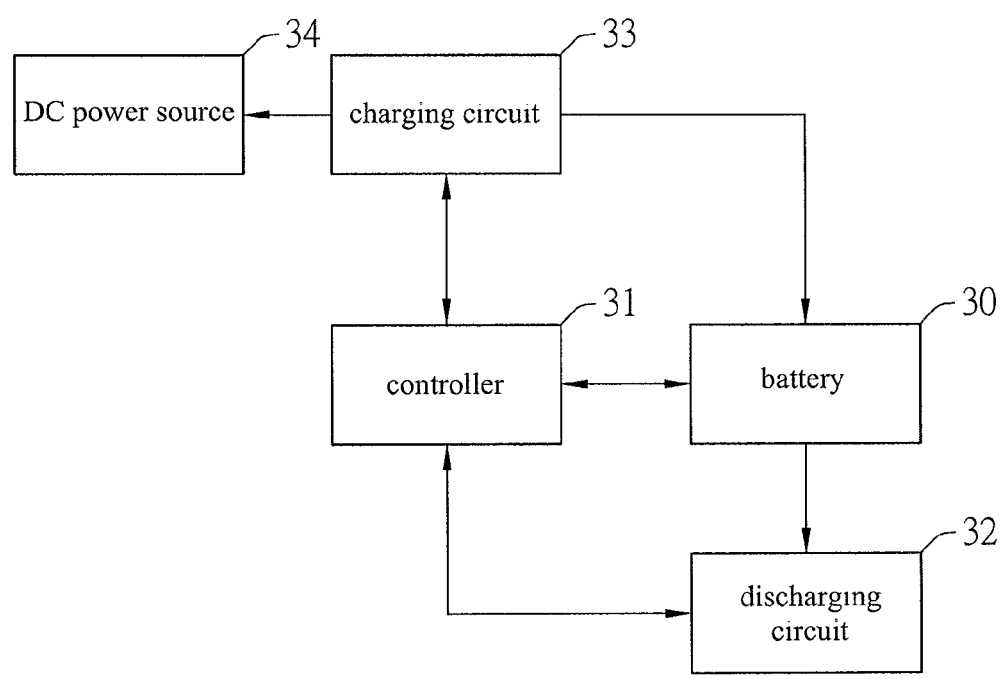
FIG. 3 is a functional block of an electronic device, to which a method of activating a battery according to the present invention is applied.

Please refer to FIG. 3, which is a functional block of an electronic device, to which a method of activating a battery according to the present invention is applied. As shown in FIG. 3, a method of activating a battery according to the present invention may be applied to an electronic device that comprises a battery 30, a controller 31, a discharging circuit 32, a charging circuit 33 and a DC power source 34.

In an embodiment, the battery 30 may have a programmable storage unit, such as an (EEPROM), and the controller 31 may be an embedded controller (EC). The controller 31 acquires programmable storage parameters of the battery 30, including a full power level, a remaining power level, states, an activation number or an activation interval of the battery 30, to determine whether or not to perform an activation process on the battery 30. A flag may be set to indicate the states of the battery 30. For example, the flag of "1" indicates that the battery 30 is operating in an activation state, and the flag of "0" indicates that the battery 30 is operating in an inactivation state. When it is determined that the battery 30 needs to be activated, i.e., executing steps S104 and S106 and proceeding to step S107, as shown in FIG. 1, the controller 31 disconnects the charging circuit 33 from the DC power source 34, then enables the discharging circuit 32 to discharge the battery 30, until the battery 30 has 10% power level left, and shuts off the discharging circuit 32 and connects the charging circuit 33 with the DC power source 34 to charge the battery 30, until the battery 30 has a maximum power level. After the battery 30 is charged completed, the controller 31 shuts off the discharging circuit 32 and updates the programmable storage parameters of the battery 30, i.e., setting the flag to be "0," for subsequent determination steps, e.g., step S102 of FIG. 1 or step S202 of FIG. 2.

A method of activating a battery according to the present invention may be applied to an electronic device having a battery, a controller, a discharging circuit and a charging circuit. An application program in an operating system or the controller in the electronic device performs the method of activating a battery. Whether the activation process is performed is determined based on states, an activation number, an activation interval or battery power level of the battery. Therefore, a problem of the prior art that chemical substances will be cured if the battery is operating in a charging state for a long term is solved, and the chemical substances in the battery can be activated completely, such that the battery has a better charging efficiency and a longer lifespan.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A method of activating a battery, applied to an electronic device which has a battery charging/discharging controller and keeps counting system time to acquire a system date, comprising the steps of:
   (1) acquiring data of the battery, including states, an activation number and a last activation date of the battery;
   (2) enabling the controller to perform an activation process on the battery and set the battery in an activation state when determining, based on the data of the battery, that the battery is in an inactivation state, the activation number of the battery is smaller than a predetermined activation number, and an interval between the last activation date of the battery and the system date is greater than a predetermined activation interval;
   (3) enabling the controller to discharge the battery, and enabling the controller to charge the battery when determining that a battery power level of the battery is less than a predetermined power level; and
   (4) enabling the controller to set the battery in the inactivation state after the activation process is finished.

2. The method of claim 1, wherein the data of the battery further comprise one or more of a full power level, a current power level and a power capacity of the battery.

3. The method of claim 1, wherein, when the controller begins to perform the activation process, step (2) further comprises:
   (2-1) updating the last activation date with the system date acquired by counting the system time.

4. The method of claim 3, further comprising storing the updated last activation date into the battery.

5. The method of claim 1, wherein step (2) further comprises:
   (2-2) clearing the activation number of the battery and updating the system date corresponding to the activation number to be the last activation date, when determining, based on the acquired data of the battery, that the battery is in the inactivation state and that the activation number of the battery is not less than the predetermined activation number; and
   (2-3) acquiring and recording the system date corresponding to the system time counted by the electronic device, and returning to step (1) when determining, after predetermined time based on the recorded system date, that a difference between the predetermined time and the recorded system date is greater than a predetermined read time interval.

6. The method of claim 1, wherein step (2) further comprises:
   (2-4) acquiring and recording the system date corresponding to the system time counted by the electronic device when determining, based on the acquired data of the battery, that the battery is in the inactivation state, the activation number of the battery is smaller than the predetermined activation number and the interval between the last activation date of the battery and the system date is not greater than the predetermined activation interval, and returning to step (1) when determining, after predetermined time based on the recorded system date, that a difference between the predetermined time and the recorded system date is greater than a predetermined read time interval.

7. The method of claim 1, wherein step (2) further comprises, before the controller performs the activation process, displaying on the electronic device an querying window as to whether to perform the activation process.

8. The method of claim 1, wherein step (2) further comprises:
   (2-5) acquiring and recording the system date corresponding to the system time counted by the electronic device when determining, based on the acquired data of the battery, that the battery is in the activation state, and returning to step (1) when determining, after predetermined time based on the recorded system date, that a difference between the predetermined time and the recorded system date is greater than a predetermined read time interval.

9. The method of claim 1, wherein, if the activation process performed on the battery is interrupted and the electronic device is turned off, step (3) further comprises:
   (3-1) enabling the controller to acquire the data of the battery, and enabling the controller to determine an activation stage of the battery when the battery is determined being in the activation state;
   (3-2) when determining that the activation stage of the battery is a discharging stage and that the battery power level is not less than the predetermined power level, enabling the controller to discharge the battery, until the battery power level is less than the predetermined power level, and enabling the controller to charge the battery and proceeding to step (4); and
   (3-3) when determining the activation stage of the battery is a charging stage, enabling the controller to charge the battery, and proceeding to step (4).

10. The method of claim 1, wherein in step (2), a setting result of the activation state is stored in the battery when the controller begins to perform the activation process.

11. The method of claim 1, wherein in step (3), after the activation process performed on the battery is complete and when the controller sets the battery in the inactivation state, a setting result of the inactivation state is stored in the battery.

12. The method of claim 1, wherein, when the controller begins to perform the activation process, step (2) further comprises:
(2-6) accumulating the activation number and updating the last activation date of the battery with the system date acquired by counting the system time.

13. The method of claim 12, wherein step (2-6) further comprises: enabling the controller to store the accumulated activation number and the updated last activation date into the battery.

* * * * *